March 23, 1971     R. FEUER     3,572,115
ALTITUDE RATE TRANSDUCER AND COMPUTING CIRCUIT
Filed Aug. 12, 1969
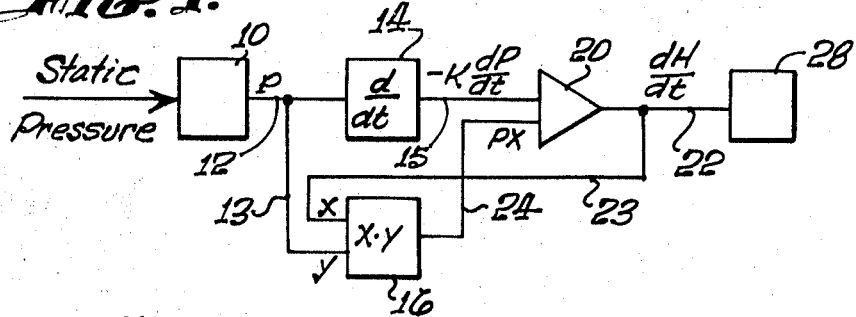
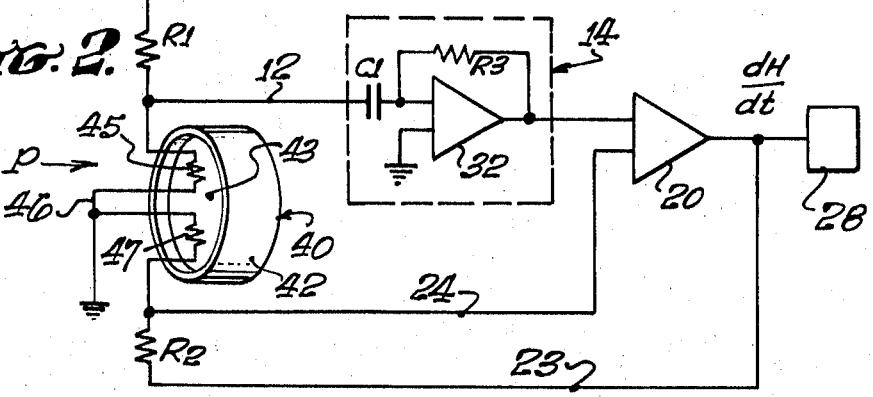
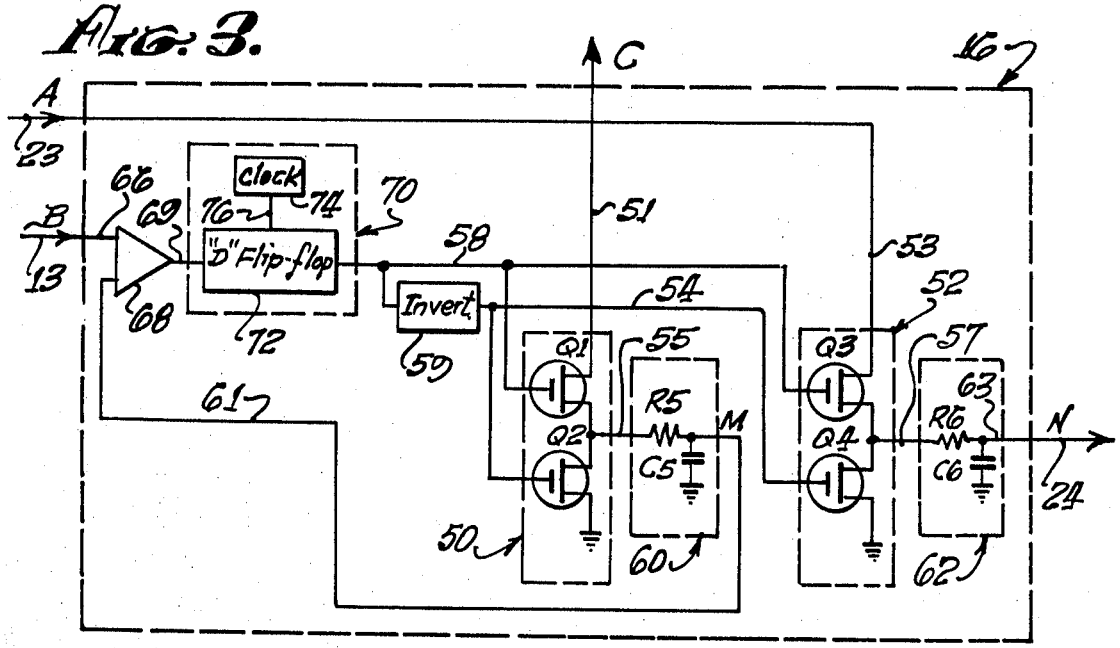
INVENTOR.
ROBERT FEUER,
By Charlton M. Lewis United States Patent Office 3,572,115
Patented Mar. 23, 1971

3,572,115
ALTITUDE RATE TRANSDUCER AND
COMPUTING CIRCUIT
Robert Feuer, Wayne, N.J., assignor to Conrac
Corporation, New York, N.Y.
Filed Aug. 12, 1969, Ser. No. 849,366
Int. Cl. G01c 21/00
U.S. Cl. 73—179  5 Claims

ABSTRACT OF THE DISCLOSURE

An altitude rate signal is developed electronically by differentiating a static pressure signal P and solving the equation $dH/dt = -(K/P) \cdot (dP/dt)$ by linear operations which include representing the product of P by a variable voltage. In one modification a piezoresistive static pressure transducer is energized by the voltage, and the transducer output is utilized to represent the product. Another modification represents the product by linear circuitry capable generally of deriving any function of the form $AB/C$ from input signals representing A, B and C. Two choppers are driven synchronously with variable on-off ratio. Circuitry including one chopper maintains the chopping ratio proportional to $B/C$, while the other chopper multiplies that function by A.

---

The present invention has to do with altitude rate transducers, and also with electronic analogue computing circuits that are particularly suitable for use in such transducers as well as for other uses.

An important general purpose of the present invention is to derive from ambient static pressure an electrical analogue signal representing the rate of change of the altitude of an aircraft or other vehicle in the atmosphere.

The invention provides an altitude rate transducer that is entirely linear in its action, and does not require non-linear circuits or other devices for approximating non-linear relationships among functions.

The invention further provides an electronic altitude rate transducer that does not require any mechanical or electromechanical devices, such as servo motors and the like.

The systems of the invention are particularly well adapted for making optimum use of solid state techniques in both the sensing and computation circuitry of the transducer. Altitude rate transducers in accordance with the invention are therefore inherently capable of being remarkably compact in form, economical to produce and reliable in operation.

Moreover, the altitude rate transducers of the invention are capable of responding to changes of static pressure without appreciable lag, so that the most desirable time constant for response may be obtained by conventional application of suitable electrical filter networks.

The derivation of an altitude rate signal from a signal representing static pressure involves both a conversion from static pressure to altitude and a differentiation with respect to time. A commonly used approximation for relating the altitude H and static pressure P is $$H = -K \log (P/P_0) \quad (1)$$

where K is a constant and $P_0$ is the pressure at a reference altitude. Differentiation of (1) gives $$\frac{dH}{dt} = -K \frac{1}{P} \frac{dP}{dt} \quad (2)$$

The log function in (1) or the hyperbolic function $1/P$ in (2) can be approximated by using a non-linear transducer or by introducing a suitable non-linear signal translating circuit component such as a shaped potentiometer, for example. Such reliance on a shaped potentiometer is typically described in Pat. 3,098,381. However non-linear components tend to be expensive. Moreover, any electromechanical device with moving parts, such as a bellows or potentiometer, or the servo drive motor and tachometer that are required in many prior art circuits, tends to be bulky and unreliable.

The present invention avoids such disadvantages of previously available altitude rate transducers by using a linear pressure transducer to develop an electrical static pressure signal, and then using linear electronics to solve Equation 2. The resulting system involves no approximations beyond those implicit in Equation 1, which are gradual in their effect and well understood. Since the system requires no curve-matching adjustments it is inherently reliable.

The present method of solving Equation 2 utilizes the known implicit function technique, and will be best understood by writing the equation in the form $$P = \frac{dH}{dt} = -K \frac{dP}{dt} \quad (3)$$

In the electronic solution of Equation 3 an electrical signal representing the left side of the equation is derived by effectively multiplying two signals, one representing P and the other representing $dH/dt$. That electrical signal is compared to a signal representing $-KdP/dt$, and the resulting difference signal is amplified. The amplifier output is utilized as the representation of $dH/dt$ for computing the left side of the equation, and also as the output representation of altitude rate.

Whereas the multiplication of P by $dH/dt$ may be carried out in any suitable manner, the present invention includes two particularly convenient and effective multiplication procedures.

One of those multiplication procedures depends upon the fact that one of the factors represents static pressure, and utilizes a pressure transducer of any type that is powered by an input voltage and produces a signal proportional both to the input voltage and the static pressure. Piezoresistive strain gage transducers are particularly suitable for that purpose. If the input voltage to such a transducer represents $dH/dt$, the transducer output directly represents the required product.

Another multiplication procedure provided by the present invention is useful for multiplying any two factors that are, or can be, represented as direct current voltages. Moreover, that procedure is also useful generally for producing an analogue signal representing any function of the form $AB/C$, where A, B and C are represented as input analogue signals, which may be fixed or variable. That computation system has the outstanding advantage of utilizing only linear operations, and is readily instrumented in solid state form.

In accordance with this aspect of the invention, two chopper circuits are driven synchronously with variable on-off ratio, which is variable in response to a control voltage. A voltage representing input C is interrupted by one chopper. The resulting square wave is averaged, as by a low-pass filter, and the average amplitude is compared to the input signal representing the factor A. The difference signal is amplified and supplied as control voltage to the chopper drive, thus maintaining the chopping ratio proportional to the quotient A/C. The input signal representing the other factor B is interrupted by the second chopper, and the resulting square wave is averaged to produce a representation of the function AB/C. In the computation required for the present altitude rate transducer the quantity C corresponds to a constant factor of proportionality, and is represented simply by a constant reference voltage.

A full understanding of the invention, and of its further objects and advantages, will be had from the following description of certain illustrative manners of carrying it out, with reference to the accompanying drawings, in which FIG. 1 is a schematic block diagram illustrating the invention;

FIG. 2 is a schematic diagram representing an illustrative circuit in accordance with one aspect of the invention; and FIG. 3 is a schematic diagram illustrating an electronic multiplying circuit in accordance with another aspect of the invention.

In FIG. 1 a pressure transducer is indicated schematically at 10, subjected to ambient static pressure. Transducer 10 produces on the line 12 an electrical signal representing static pressure P. That signal is supplied to the differentiating and inverting circuit shown schematically at 14, and is also supplied as input $y$ to the multiplying circuit shown schematically at 16. Circuit 14 produces on the line 15 a signal representing the derivative of static pressure with respect to time, multiplied by a constant K and having polarity opposite to that of the actual derivative. That signal $-K(dP/dt)$ is supplied as positive input to the amplifier 20. The amplifier output on the line 22 is supplied via the line 23 as input $x$ to multiplying circuit 16. Hence the output from circuit 16 is a signal representing the product $xy$, $y$ representing static pressure and $x$ representing the output of amplifier 20. That signal $Px$ is supplied via the line 24 as negative input to amplifier 20.

Representing the gain of amplifier 20 as A, the amplifier output $x$ is $$x = A\left(-K\frac{dP}{dt} - Px\right) \quad (4)$$

from which $$Px + \frac{x}{A} = -K\frac{dP}{dt} \quad (5)$$

For any large value of A the term $x/A$ is negligibly small, so that $$Px = -K\frac{dP}{dt} \quad (6)$$

In view of Equation 3 above, the only value of $x$ that will satisfy Equation 6 is $x = dH/dt$. Therefore the output $x$ from amplifier 20 correctly represents the altitude rate and may be supplied from line 22 to any desired utilization device, represented schematically at 28.

FIG. 2 represents a system corresponding generally to FIG. 1, and employing the same numerals for designating corresponding parts. Differentiating circuit 14 is shown explicitly in FIG. 2 as the illustrative conventional type of differentiating and inverting circuit comprising the capacitor C1 and the amplifier 32 with the feedback resistance R3.

The multiplying function of circuit 16 of FIG. 1 and the transducer function of transducer 10 are incorporated in FIG. 2 in the transducer assembly 40. That assembly typically comprises an evacuated housing 42 of which one wall 43 forms a diaphragm exposed on its outer face to static pressure P. Two piezo-resistive elements 45 and 47 are mounted on the face of wall 43, or are formed integrally with that wall in known manner, so that their respective resistances vary similarly in proportion to the applied pressure P. A constant reference voltage V is applied via the reference resistance R1 to one terminal of element 45, the other terminal being grounded via the line 46. The voltage tapped from the junction 48 of R1 and element 45 then varies in proportion to the pressure, the constant of proportionality including the constant reference voltage V, and provides the desired signal P on line 12.

The second piezo-resistive element 47 on diaphragm 43 receives current via the resistance R2 and line 23 from the variable voltage $x$ at the output of amplifier 20. The signal tapped from the junction 49 of R2 and element 47 is therefore proportional both to pressure P acting on diaphragm 43 and to the magnitude of the voltage $x$. That signal therefore corresponds to $Px$ of FIG. 1 and may be supplied directly via the line 24 as input to amplifier 20.

The form of multiplying circuit just described is remarkably simple and straightforward and is extremely economical of space. In actual practice the single elements 45 and 47 and their associated resistances R1 and R2 may be replaced by four elements each, suitably located on diaphragm 43 and electrically connected in known manner to form respective bridge networks with outputs on lines 12 and 24. If desired, the two piezo-resistive elements 45 and 47 or their equivalent may be mounted on entirely separate pressure diaphragm, rather than on a common diaphragm as illustratively shown. Also, the described piezo-resistive transducers may be replaced by pressure transducers of any suitable type of developing the two signals P and $Px$. As an example, two linear potentiometers may be driven in tandem by a pressure responsive capsule, with their windings energized by the respective voltages V and $x$ and their brushes connected to the respective lines 12 and 24.

If for any reason it is preferred not to use the general method illustrated in FIG. 2 for producing the signal $Px$, a straightforward multiplying circuit of any suitable type may be employed for multiplying the signals $x$ and $y$, as indicated at 16 in FIG. 1. A particularly convenient and effective multiplying circuit for that and other purposes is represented illustratively in FIG. 3.

The two series-shunt choppers 50 and 52 receive respective input voltages via the lines 51 and 53. The input to chopper 50, designated C, is a constant reference voltage for the present circuit application, but may be a variable input voltage for other applications. The input to chopper 52 is a variable voltage A that represents one of the factors to be multiplied, typically corresponding to the signal $x$ on line 23 in FIG. 1. Choppers 50 and 52 typically comprise the respective pairs of transistors Q1, Q2 and Q3, Q4, shown as metal oxide semiconductors (MOS) field effect transistors, which are particularly suitable for the purpose, especially as they can handle both positive and negative input voltages. Neglecting the small voltage drops between source and drain of the MOS transistors when conducting, the resulting output signals on the output lines 55 and 57 are equal to the respective input voltages when series transistors Q1 and Q3 are conductive, and are equal to ground potential when shunt transistors Q2 and Q4 are conductive.

The square wave chopper outputs are averaged by the respective filtering circuits 60 and 62, which may be of any suitable type and are shown as simple RC circuits comprising the respective series resistors R5 and R6 and the shunt capacitors C5 and C6. The outputs M and N from those filters on the respective lines 61 and 63 are direct current voltages which are equal to the respective input voltages to the choppers multiplied by the shopping ratio or duty cycle of the chopper, that is, the average time the chopper is conductive divided by the total time. Since the two choppers are driven in synchronism from line 58, as described below, both operate with the same duty cycle, and the ratio of the output voltage M to its input voltage C is therefore equal to the ratio of output voltage N to its input A.

The second factor to be multiplied is represented by a voltage signal B, typically corresponding to the signal $y$ on line 13 of FIG. 1. That signal is supplied via the line 66 to the comparator and amplifier 68, which receives as reference input the signal M from line 61. Comparator 68 thus effectively compares signals B and M, and produces on the line 69 an output signal which is a greatly amplified representation of the difference between those two signals. That difference signal may be supplied directly to the line 58 for control of choppers 50 and 52, suitable precautions being taken in the design of the rest of the circuit to obtain stable operation.

A preferred manner of insuring stability of chopper action under a wide range of operating conditions is to supply the difference signal to the switching circuit via a gating or control circuit that produces a discrete shift of control voltage as the difference signal crosses a set threshold value. The control circuit shown illustratively at 70 comprises a flip-flop 72 of the known type, commonly designated by the letter D, having two stable states between which it is shifted under selective control of the input signal from line 69 and under time control of a clock pulse received from the clock 74 via the line 76. Upon receipt of a clock pulse, flip-flop 72 shifts to one state if the input signal on line 69 is less than a reference value, typically ground, and is shifted to the other state if the signal exceeds the reference value. In one of those states, which will be called its active state, flip-flop 72 produces on line 58 a voltage signal of suitable amplitude and polarity to render series transistors Q1 and Q3 conductive, and produces via the inverter 59 and line 54 and inverted voltage that cuts off shunt transistors Q2 and Q4. In the idle state of flip-flop 72, the output on line 58 is such as to shift all four transistors to their opposite conditions. The set frequency of the clock pulses prevents runaway oscillation of the system, but may be as fast as the switching circuits can reliably follow.

In operation of control circuit 70, if signal M from chopper 50 is less than B, for example, flip-flop 72 is shifted at the next following clock pulse to its active state, rendering both choppers series conductive. Filter 60 therefor receives via line 55 essentially the full voltage C, causing the signal M to increase at a rate controlled by the time constant of R5 and C5. Flip-flop 72 continues in active state despite subsequent clock pulses until signal M becomes larger than B. At the next following clock pulse the flip-flop is shifted to idle state, isolating filter 60 from voltage V and connecting its input line 55 to ground. Signal M then decays with the filter time constant. When M becomes less than B the next clock pulse renders flip-flop 72 active again. Under equilibrium conditions the flip-flop is shifted back and forth at each clock pulse, or every few clock pulses, the precise pattern being typically variable, but developing a duty cycle that maintains M effectively equal to B.

Since chopper 52 is driven synchronously with chopper 50, the two duty cycles are equal and $$\frac{N}{A} = \frac{M}{C} \quad (7)$$

Setting $M=B$, Equation 7 gives $$N = AB/C \quad (8)$$

Accordingly, the signal N produced on line 63 directly represents the function of the three input voltages given by Equation 8. By supplying signals $x$ and $y$ of FIG. 1 as inputs A and B in FIG. 3, and supplying a constant reference voltage at C representing a suitable constant of proportionality $1/K$, the output N from FIG. 3 may be supplied to line 24 of FIG. 1 as the signal $Px$, previously discussed.

It will be evident that the specific circuitry shown for choppers 50 and 52 may be replaced by a wide variety of known chopping circuits which are controllable in response to input signals. Also control circuit 70 is intended to represent any suitable gating circuit configuration capable of producing a step voltage in response to a continuously variable input control signal.

Whereas the multiplying circuit shown illustratively in FIG. 3 is particularly well adapted for use in the present type of altitude rate transducer, it is also capable of producing an output that accurately represents the product of any two factors that can be represented as input voltages, corresponding to A and B of FIG. 3, input C being held constant. For example, the present multiplying circuit can be connected with a suitable servo loop, in the same manner as prior art multiplying circuits, to produce such functions as square roots. If input C also represents a variable quantity, the circuit becomes a dividing circuit, producing simple quotients or functions of the form $AB/C$.

I claim:
1. An altitude rate transducer comprising in combination
   a pressure transducer for producing an output signal representing ambient atmospheric static pressure,
   means for differentiating the static pressure signal to produce a first input signal proportional to the rate of change of static pressure,
   an amplifier having two input terminals and producing an output signal proportional to the voltage difference at the input terminals,
   means for producing a second input signal proportional to the product of the static pressure and the amplifier output signal,
   circuit means for supplying the first and second input signals ot the respective input terminals of the amplifier, and
   output circuit means responsive to the output signal of the amplifier.

2. An altitude rate transducer as defined in claim 1, and in which said means for producing said second input signal comprise
   a piezoresistive strain gage responsive to ambient static pressure,
   circuit means for supplying to the strain gage electrical voltage proportional to the amplifier output signal, and
   means for deriving said second input signal from the output of the strain gage.

3. An altitude rate transducer as defined in claim 1, and in which said means for producing said second input signal comprise
   multiplying circuit means having two input terminals and acting to produce an output signal proportional to the product of the signals at the respective input terminals, and
   circuit means for supplying as signals to the respective input terminals of said multiplying circuit means the output signal from said pressure transducer and the output signal from said amplifier.

4. An altitude rate transducer as defined in claim 1, and in which said means for producing said second input signal comprise
   switching means having first and second input terminals and acting to produce first and second cyclic square waves having amplitudes proportional to the signals at the respective input terminals, and having duty cycles that are correspondingly variable under control of a control signal,
   means for separately averaging the square waves to produce respective first and second derived signals,
   means for producing a constant reference signal, circuit means for supplying the reference signal and said amplifier output signal to the respective first and second input terminals of the switching means, means for comparing the first derived signal and a signal representing static pressure to develop a difference signal, means responsive to the difference signal for supplying a control signal to the switch means to vary the duty cycles in a direction to maintain a null value of the difference signal, and output means for supplying the second derived signal as said second input signal.

5. The method of representing the rate of climb of a vehicle in the atmosphere, comprising in combination producing a first signal that represents the rate of change of the ambient atmospheric static pressure, producing a variable electrical voltage, producing a second signal that represent the product of the ambient static pressure and the variable voltage, varying the variable voltage to maintain the second signal equal to the first signal, and utilizing the variable voltage as a representation of the rate of climb of the vehicle.

References Cited

UNITED STATES PATENTS 3,055,214  9/1962  McLane _____ 73—179X
3,358,505  12/1967  Andresen, Jr. _____ 73—179

DONALD O. WOODIEL, Primary Examiner